Figure 1:
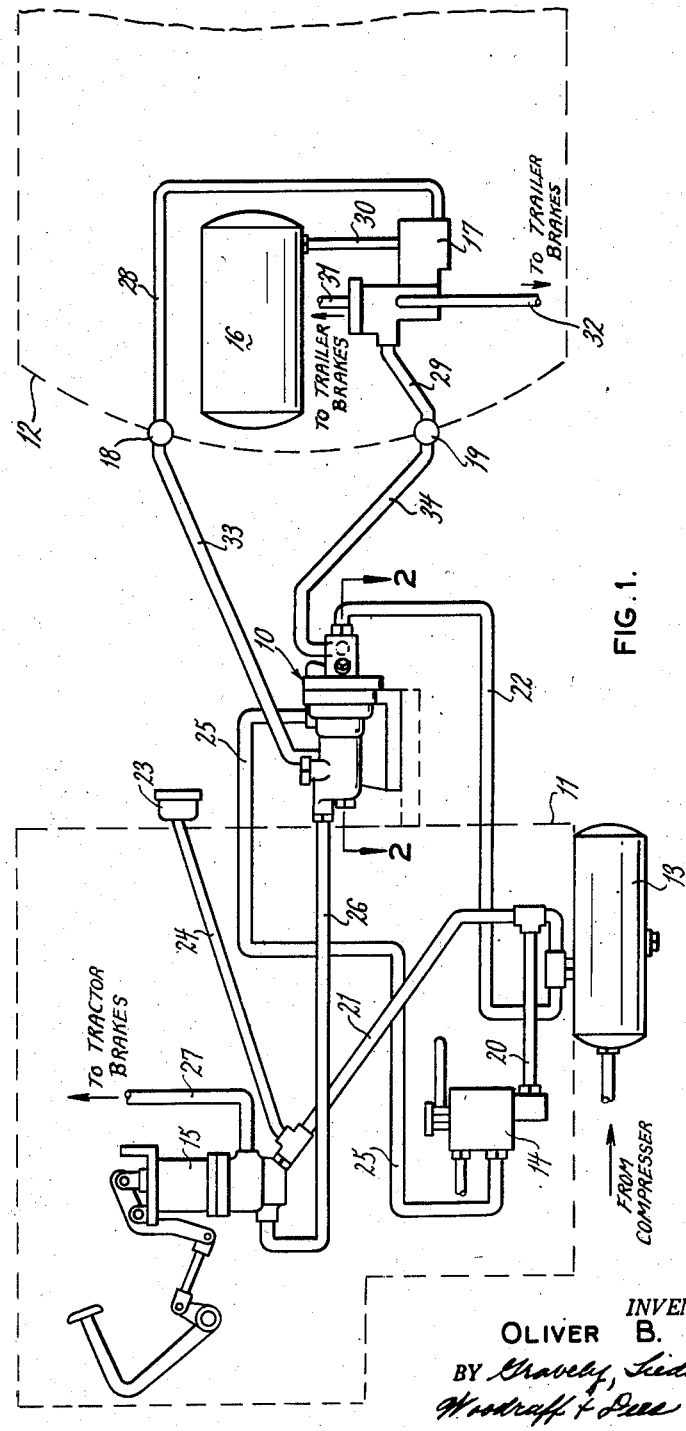

INVENTOR.
OLIVER B. CRUSE
BY
ATTORNEYS

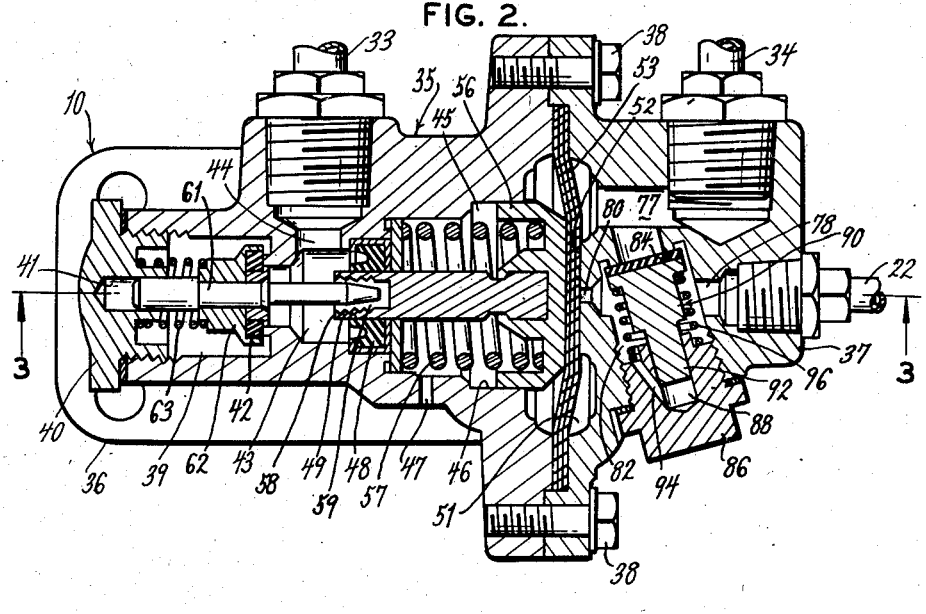

2,826,212

EMERGENCY BREAK-AWAY VALVE WITH AUTOMATIC BY-PASS

Oliver B. Cruse, Berkeley, Mo., assignor to Wagner Electric Corporation, St. Louis, Mo., a corporation of Delaware Application September 15, 1952, Serial No. 309,692

5 Claims. (Cl. 137—115)

The present invention relates generally to tractor-trailer braking systems, and more particularly to a novel emergency break-away valve with an automatic by-pass between the supply line leading to the valve and the emergency line between the valve and the trailer.

In the conventional tractor-trailer braking system there is an emergency line and a service line which run from the tractor supply tank or reservoir to the trailer, the emergency line serving as a relatively direct connection between the tractor supply tank and the trailer reservoir, and the service line providing a means for applying the trailer brakes under normal operating conditions. Recent developments in the air brake field has brought forth a break-away valve which is mounted on the tractor and which is interposed in the emergency and service lines to preserve sufficient tractor tank pressure to brake the tractor when either the service or emergency lines to the trailer become ruptured or severed. For explanatory purposes the portion of the emergency line between the tractor supply tank and the aforementioned break-away valve will hereinafter be referred to as the tractor supply line.

In one of said recently developed valves, means are provided for automatically closing off the emergency line and the service line to the trailer when the pressure in either the emergency line or in the tractor supply line decreased below a predetermined value, as when a leakage or breakage occurred in either the emergency line or the service line.

In the conventional tractor-trailer braking system, an emergency relay valve is normally provided on the trailer to automatically set its brakes whenever the pressure in the emergency line decreases below a predetermined value.

In the known break-away valve referred to hereinabove, it is possible for sufficient pressure to be trapped in the emergency line upon the closing off of the emergency and service lines, as when the supply line develops a leak or is broken between the supply tank and the emergency breakaway valve, to prevent the automatic operation of the emergency relay valve and the setting of the trailer brakes. This can be overcome to some extent by selecting a relatively weak spring for actuating the emergency break-away valve closing means (as will be more fully described hereinafter) but this construction is not completely satisfactory because it may not meet the requirements of all installations.

It is an object of the present invention, therefore, to provide an emergency break-away valve with automatic by-pass means for automatically reducing the pressure in the emergency line when the supply pressure decreases a predetermined amount below the pressure in the emergency line. More particularly, it is an object to provide an emergency break-away valve with such automatic by-pass means for automatically interconnecting the emergency line and the fluid pressure supply line when the pressure in the latter decreases below the pressure in the emergency line. Specifically, it is an object to provide an emergency break-away valve with an automatic by-pass valve connected between the emergency line and the supply line from the tractor tank, whereby the emergency line and the supply line are connected together when the pressure in the latter drops below the pressure in the emergency line, as when a leak occurs in the supply line between the supply tank and the emergency break-away valve.

Further objects and advantages of the present invention will be apparent from the following detailed description, reference being had to the accompanying drawings wherein a preferred embodiment of the present invention is shown.

Briefly, the invention comprises providing a break-away valve with a one-way by-pass valve between the supply line leading into the break-away valve, and the emergency line leading from said valve whereby fluid can flow from the emergency line to the supply line but is prevented from flowing in the reverse direction.

In the drawings:

Fig. 1 is a somewhat schematic view of a portion of a tractor-trailer braking system including an emergency break-away valve provided with an automatic by-pass valve constructed in accordance with the teachings of the present invention, Fig. 2 is an enlarged horizontal axial sectional view of the emergency break-away valve, taken on the line 2—2 in Fig. 1, and Fig. 3 is a vertical axial sectional view of the valve taken on the line 3—3 in Fig. 2.

The braking system shown in Fig. 1 includes an emergency break-away valve 10 positioned between a tractor 11 and a trailer 12 (illustrated schematically). Mounted on the tractor 11 are a storage or supply tank 13, a hand valve 14, and a foot valve 15; and mounted on the trailer 12 are a reservoir 16, an emergency relay valve 17, and two couplings 18 and 19.

The storage or supply tank 13 is connected to the hand valve 14 through a conduit 20, to the foot valve 15 through a conduit 21, and to the emergency valve 10 through a conduit 22.

A pressure gauge 23 is connected to the conduit 21 through a conduit 24 so as to indicate the pressure in the storage tank 13.

A conduit 25 extends from the hand valve 14 and connects it with the emergency valve 10, and a conduit 26 extends from the foot valve 15 and connects the latter with the emergency valve 10; the foot valve 15 also being in communication with the tractor brakes (not shown) through a conduit 27.

On the trailer 12, the coupling 18 is connected to the emergency relay valve 17 through a conduit 28, and the coupling 19 is connected therewith through a conduit 29.

The trailer reservoir 16 and the emergency relay valve 17 are connected together by a conduit 30, and conduits 31 and 32 lead from the emergency relay valve 17 to the trailer brakes (not shown).

A service line 33 connects the emergency valve 10 with the coupling 18, and an emergency line 34 connects the valve 10 with the coupling 19.

As shown more particularly in Figs. 2 and 3, the emergency valve 10 includes a body member 35 which has a base portion 36, and a cap 37 removably fastened to the right hand end thereof by bolts 38.

The body member 35 contains an axial bore at the left side thereof which forms a first valve chamber 39, the outer end of the chamber being closed by a plug 40 which has a bore 41 formed therein. A valve seat 42 is provided at the right hand end of the first valve chamber 39. In communication with the first valve chamber 39 and spaced axially inwardly therefrom is a conduit chamber 43 which is in communication with the service conduit 33 through a port 44.

To the right of the conduit chamber 43 there is a second valve chamber 45 which has a side wall 46, and which is in communication with the atmosphere through a vent port 47 (Fig. 3).

The conduit chamber 43 is separated from the second valve chamber 45 by a resilient sealing member 48 which has a circular passageway 49 extending therethrough.

The right hand end of the second valve chamber 45 is enlarged to form the left half of a diaphragm chamber 51, the right half of the diaphragm chamber being contained in the cap member 37. The right half of the diaphragm chamber 51 is annular in shape so as to provide a valve seat 52 adjacent the center thereof.

A diaphragm 53 extends transversely of the diaphragm chamber 51 and is held in position between the base portion 36 and the cap 37 by the bolts 38.

Mounted within the second valve chamber 45 is a piston-like member 56 in sliding contact with the wall 46, the right hand end of the piston member 56 being urged against the diaphragm 53 by a coil spring 57.

A shaft 58 is connected to the piston-like member 56 and extends leftwardly through the opening 49 in the sealing member 48, and into the conduit chamber 43, the left hand end of the shaft 58 containing an internally threaded cavity 59.

A valve rod 61 has the right end thereof loosely disposed in the cavity 59 and extends leftwardly through the valve chamber 39 and has its left hand end disposed in, and guided by the bore 41 in the plug 40. Mounted on the valve rod 61 is a valve member 62 which is yieldably biased towards the valve seat 42 by a coiled spring 63.

As shown more particularly in Fig. 3, a series of passageways extend across the upper portion of the valve body 35 and includes a third valve chamber 64 at the left side. The left hand end of this chamber contains a plug 65 with a passageway therethrough in communication with the conduit 26, the inner end of the plug 65 forming a valve seat 66. At the right hand end of the valve chamber 64 there is another valve seat 67, and slidably mounted within the chamber in sliding contact with the side wall thereof, is a valve member 68 which is adapted to seat against either the valve seat 66 or the valve seat 67, depending on the pressure conditions within the valve chamber 64, as will appear. A passageway 69 extends downwardly from adjacent the center of the third valve chamber so as to connect it with the first valve chamber 39.

Extending from the right hand end of the third valve chamber 64 (Fig. 3) is a passageway 71 which extends upwardly so as to be in communication with the conduit 25, and thence rightwardly to a fourth valve chamber 72.

The left hand end of the fourth valve chamber 72 is provided with a valve seat 73 and mounted within the chamber is a check valve member 74 which is yieldably urged toward the valve seat 73 by a coiled spring 75.

A passageway 76 (Fig. 3) extends rightwardly and thence inwardly from the fourth valve chamber 72 to the diaphragm chamber 51 to the right of diaphragm 53.

As shown more particularly in Fig. 2, a passageway 77 extends rightwardly from the right side of the diaphragm chamber 51 to the port which receives the conduit 34.

Extending inwardly from the conduit 22 is a passageway 78 (Fig. 2) which has the inner end thereof in communication with the right hand side of the diaphragm chamber 51 through a restriction 80.

Intersecting the passageway 78 is a bore or valve chamber 82 which extends inwardly from the outer surface of the cap 37 to the passageway 77. A valve seat 84 is provided in the valve chamber 82 adjacent the inner end thereof facing toward the passageway 78. Threadedly mounted in the outer end of the valve chamber 82 is a valve guide and closure member 86 which contains a cylindrical guideway 88 in the inner face thereof.

A valve member 90, which includes a stem portion 92, is positioned within the valve chamber 82 for cooperation with the valve seat 84, the stem portion 92 of the valve being slidably received in the guideway 88.

A pressure equalizing passageway 94 is contained in the closure member 86 so as to connect the interior of the valve chamber 82 with the guideway 88 beyond the outer end of the stem portion 92. Thus, it will be noted that the effective areas of the end surfaces of the valve member 90 which are exposed to the opposing pressures in the passageways 77 and 78, are approximately the same.

A coiled spring 96 is disposed about the valve member 90 and has one end thereof in abutting relationship with the closure member 86 so as to urge the valve member 90 toward the valve seat 84, and the closed position. The spring 96 exerts a very light pressure against the valve member 90, and, because the opposing effective end surfaces of the valve 90 are of approximately the same area, the valve 90 will open when the pressure in the valve chamber 82 and the supply line 22 is slightly less than the pressure in the passageway 77 and the emergency line 34.

Operation

Assuming that the supply line 22 between the supply tank 13 and the emergency break-away valve 10 develops a leak, and that the emergency line 34 remains intact, the supply pressure in the system will diminish at a rate which depends on the difference between the rate at which the fluid escapes from the leak, and the rate at which the compressor (not shown) can replenish the pressure in the supply tank 13.

As the pressure in the supply line 22 decreases, the pressure in the emergency line 34 drops in like manner because the two lines are in communication through the passageway 77, the right-hand side of the diaphragm chamber 51, the restriction 80, and the passageway 78.

This reduction of the pressure in the supply line 22 and in the emergency line 34 will continue until the force exerted by the spring 57 overcomes the pressure in the right-hand side of the diaphragm chamber 51, so as to close the valve 53, 52 and thereby trap the fluid remaining in the emergency line 34.

If the relationship between the force exerted by the spring 57 and the pressure in the emergency line 34 required to cause the operation of the emergency relay valve 17 are such that the latter will be actuated to apply the trailer brakes before the valve 53, 52 closes, it will not be necessary for the by-pass valve 90 to become operative. However, because of the differences in the setting of the emergency relay valves in the various installations, it sometimes occurs that the valve 53, 52 closes before the operation of the emergency relay valve 17 so that the fluid trapped in the emergency line 34 prevents the automatic setting of the trailer brakes.

When the automatic by-pass valve 90 is provided between the emergency line 34 and the supply line 22, the relationship between the force exerted by the spring 57 and the pressure required to cause the operation of the emergency relay valve 17 is immaterial.

Thus, assuming that the valve 53, 52 closes and traps fluid within the emergency line 34 at a pressure which is higher than that required to cause the operation of the emergency relay valve 17, the by-pass valve 90 will open to interconnect the emergency line 34 and the supply line 22 when the pressure in the latter is slightly less than the pressure in the emergency line 34. As previously mentioned, the spring 96 exerts a very small force tending to hold the valve in the closed position, and the effective areas on opposite sides of the valve 90 are substantially the same due to the construction of the valve body and the use of the pressure equalizing slot 94.

As the pressure in the supply line 22 decreases due to the loss of fluid therefrom, the pressure in the emergency line 34 decreases in like manner until it attains a value at which the emergency relay valve 17 is permitted to operate and automatically apply the trailer brakes.

Thus, it is apparent that there has been provided an emergency break-away valve with a novel automatic by-pass which fulfills all of the objects and advantages sought therefor. Fluid cannot be trapped in the emergency line 34 so as to prevent the automatic application of the trailer brakes, as when a leak occurs in the supply line between the supply tank and the break-away valve, because the by-pass valve 90 will automatically connect the supply line 22 and the emergency line 34 so as to reduce the pressure in the latter, whenever the pressure in the supply line decreases to a value slightly below the pressure in the emergency line.

It is to be understood that the foregoing description and the accompanying drawings have been given only by way of illustration and example, and that changes and alterations in the present disclosure, which will be readily apparent to one skilled in the art, are contemplated as within the scope of the present invention which is limited only by the claims which follow.

What is claimed is:

1. A device of the type described, comprising a housing containing a chamber; an inlet into said chamber and an outlet therefrom; main valve means in the chamber for controlling the flow of fluid between the inlet and the outlet including a pressure responsive member, said main valve means being movable between an open and a closed position; the outlet being in communication with one side of the pressure responsive member; yieldable means urging the main valve means toward the closed position; a bore in the housing extending inwardly from the outer surface thereof positioned to interconnect the inlet and the outlet external of the chamber; a valve seat in the bore between the inlet and the outlet facing toward the inlet; a valve member containing a stem portion reciprocally mounted within the bore for movement relative to the valve seat; yieldable means urging the valve member toward the valve seat; a closure member removably fastened in the outer end of the bore; a cavity in the inner end of the closure member for receiving the stem portion of the valve member in sliding engagement; and a passageway between said cavity beyond the end of the stem portion and said bore.

2. In an emergency break-away valve, a housing containing a chamber; an inlet into the chamber and an outlet therefrom; main valve means in the chamber including a pressure responsive member in communication with the inlet for controlling the flow of fluid through said chamber and movable between a closed position to prevent the entry of fluid into the chamber and an open position to permit the passage of fluid therethrough, the area of the pressure responsive member exposed to the fluid from the inlet being greater when the valve is in the open position than when it is in the closed position; the outlet being on the same side of the pressure responsive member as the inlet; yieldable means biasing the valve means toward the closed position; means separate from the inlet fluid pressure for moving the valve means to the open position; and normally closed bypass means for automatically interconnecting the inlet and the outlet when the pressure in the inlet is less than the pressure in the outlet.

3. In an emergency break-away valve, a housing containing a chamber; an inlet into the chamber and an outlet therefrom; main valve means in the chamber including a pressure responsive member in communication with the inlet for controlling the flow of fluid through said chamber and movable between a closed position to prevent the entry of fluid into the chamber and an open position to permit the passage of fluid therethrough, the area of the pressure responsive member exposed to the fluid from the inlet being greater when the valve is in the open position than when it is in the closed position; the outlet being on the same side of the pressure responsive member as the inlet; yieldable means biasing the valve means toward the closed position; means separate from the inlet fluid pressure for moving the valve means to the open position; and normally closed by-pass means external of the chamber for automatically interconnecting the inlet and the outlet when the fluid pressure in the outlet exceeds the fluid pressure in the inlet by a predetermined amount.

4. In an emergency break-away valve, a housing containing a chamber; an inlet into the chamber and an outlet therefrom; main valve means in the chamber including a pressure responsive member in communication with the inlet for controlling the flow of fluid through said chamber and movable between a closed position to prevent the entry of fluid into the chamber and an open position to permit the passage of fluid therethrough, the area of the pressure responsive member exposed to the fluid from the inlet being greater when the valve is in the open position than when it is in the closed position; the outlet being on the same side of the pressure responsive member as the inlet; yieldable means biasing the valve means toward the closed position; means separate from the inlet fluid pressure for moving the valve means to the open position; a passageway in the housing between the inlet and the outlet external of the chamber; and valve means in said passageway permitting fluid flow from the outlet to the inlet and preventing fluid flow in the reverse direction.

5. An emergency break-away valve, comprising a housing containing a first chamber; an inlet into said first chamber and an outlet therefrom; main valve means in the chamber including a pressure responsive member for controlling the flow of fluid through said chamber and movable between a closed position to prevent the entry of fluid into the chamber and an open position to permit the passage of fluid therethrough; yieldable means biasing the main valve means toward the closed position; means separate from the inlet fluid pressure for initially moving the main valve means to the open position; a second chamber in the housing; an inlet to the second chamber and an outlet therefrom; secondary valve means in said second chamber for controlling the flow of fluid therethrough responsive to the movement of said main valve means; and normally closed by-pass means for automatically interconnecting the inlet and the outlet to the first chamber when the pressure in the inlet is less than the pressure in the outlet.

References Cited in the file of this patent

UNITED STATES PATENTS

| | | |
|---|---|---|
| 1,583,834 | Humphrey | May 11, 1926 |
| 2,135,007 | Kamenarovic | Nov. 1, 1938 |
| 2,271,031 | Parker | Jan. 27, 1942 |
| 2,286,713 | Burks | June 16, 1942 |
| 2,411,406 | Affleck | Nov. 19, 1946 |
| 2,564,922 | Patten | Aug. 21, 1951 |
| 2,592,213 | Vanderzee | Apr. 8, 1952 |
| 2,636,576 | Affleck | Apr. 28, 1953 |
| 2,645,239 | Horn et al. | July 14, 1953 |
| 2,667,887 | Hoffackers | Feb. 2, 1954 |
| 2,704,548 | Ralston | Mar. 22, 1955 |